United States Patent
Schmidt et al.

(10) Patent No.: US 10,131,783 B2
(45) Date of Patent: Nov. 20, 2018

(54) POLYMER COMPOSITION

(71) Applicant: BIO-TEC BIOLOGISCHE NATURVERPACKUNGEN GMBH & CO. KG, Emmerich (DE)

(72) Inventors: Harald Schmidt, Emmerich (DE); Christoph Hess, Rees (DE); Christophe Bréso, Dieppe (FR); Ralf Hackfort, Emmerich (DE); Frank Rörthmans, Issum-Sevelen (DE); Wolfgang Friedek, Bedburg-Hau (DE)

(73) Assignee: BIO-TEC BIOLOGISCHE NATURVERPACKUNGEN GMBH & CO. KG, Emmerich (DE)

( * ) Notice: Subject to any disclaimer, the term of this patent is extended or adjusted under 35 U.S.C. 154(b) by 0 days.

(21) Appl. No.: 14/783,381

(22) PCT Filed: Apr. 8, 2014

(86) PCT No.: PCT/EP2014/057030
§ 371 (c)(1),
(2) Date: Oct. 8, 2015

(87) PCT Pub. No.: WO2014/166938
PCT Pub. Date: Oct. 16, 2014

(65) Prior Publication Data
US 2016/0060451 A1 Mar. 3, 2016

(30) Foreign Application Priority Data

Apr. 10, 2013 (DE) .................. 10 2013 103 614
Oct. 15, 2013 (DE) .................. 10 2013 017 024

(51) Int. Cl.
*C08L 67/02* (2006.01)
*C08L 67/04* (2006.01)
*C08L 3/02* (2006.01)

(52) U.S. Cl.
CPC .......... *C08L 67/02* (2013.01); *C08L 2203/12* (2013.01); *C08L 2203/16* (2013.01); *C08L 2205/02* (2013.01)

(58) Field of Classification Search
CPC ............. C08L 67/02; C08L 67/04; C08L 3/02
See application file for complete search history.

(56) References Cited

U.S. PATENT DOCUMENTS

| | | | | |
|---|---|---|---|---|
| 6,096,809 A * | 8/2000 | Lorcks | ............ | C08L 3/02 523/128 |
| 6,136,097 A * | 10/2000 | Lorcks | ............ | C08B 30/12 106/206.1 |
| 6,191,196 B1 * | 2/2001 | Willett | ............ | C08L 3/02 524/13 |
| 6,218,321 B1 * | 4/2001 | Lorcks | ............ | A01G 13/0237 442/165 |
| 6,235,815 B1 * | 5/2001 | Loercks | ............ | B32B 27/10 524/47 |
| 7,037,959 B1 * | 5/2006 | Willett | ............ | D21H 19/58 524/13 |
| 7,077,994 B2 * | 7/2006 | Bond | ............ | B32B 27/08 422/1 |
| 2002/0143116 A1 * | 10/2002 | Noda | ............ | B32B 27/20 525/411 |
| 2002/0168518 A1 * | 11/2002 | Bond | ............ | D01F 6/46 428/364 |
| 2003/0108701 A1 * | 6/2003 | Bond | ............ | B32B 27/08 428/35.7 |
| 2003/0166779 A1 * | 9/2003 | Khemani | ............ | C08L 67/04 525/178 |
| 2003/0187149 A1 * | 10/2003 | Schmidt | ............ | C08L 67/02 525/418 |
| 2004/0092672 A1 * | 5/2004 | Bastioli | ............ | B32B 27/36 525/450 |
| 2004/0225269 A1 * | 11/2004 | Zhao | ............ | A61F 13/26 604/364 |
| 2004/0248486 A1 * | 12/2004 | Hodson | ............ | B32B 27/04 442/79 |

(Continued)

FOREIGN PATENT DOCUMENTS

| CN | 1446247 A | 10/2003 |
|---|---|---|
| CN | 1277882 C | 10/2006 |

(Continued)

OTHER PUBLICATIONS

Funabashi et al. (16th International Conference on Composite Materials, 2007, p. 1-4) (Year: 2007).*
Chinese Office Action dated Jul. 5, 2016 issued in Chinese Application No. 201480030029.2.
International Search Report cited in PCT Application No. PCT/EP2014/057030 dated Jul. 1, 2014.
Examination Report cited in German Application No. 10 2013 103 614.7 dated Nov. 13, 2013.
Japanese Office Action in Japanese Application No. 2016-506911 dated Aug. 2, 2016.

(Continued)

*Primary Examiner* — Liam J Heincer
(74) *Attorney, Agent, or Firm* — Workman Nydegger

(57) ABSTRACT

The invention relates to a polymer compound which, based on the total weight of the polymer compound, comprises at least the following components: (a) 5 to 50 wgt.-% destructed starch and/or starch derivative, (b) 20 to 70 wgt.-% aliphatic-aromatic copolymer, (c) 10 to 50 wgt.-% polyhydroxyalkanoate and (d) 3 to 25 wgt.-% polyactic acid. Such polymer compounds are characterized by a high ratio of bio-based carbon and exhibit no significant embrittlement or worsening of the mechanical properties profile, despite the presence of increased volumes of polyhydroxyalkanoate, even after storage. The invention further relates to production methods for the polymer compound according to the invention, and use thereof in the production of films, molded parts or fibers.

33 Claims, 1 Drawing Sheet

(56) References Cited

U.S. PATENT DOCUMENTS

| | | | | |
|---|---|---|---|---|
| 2008/0281018 A1* | 11/2008 | Seeliger | C08L 67/04 | 523/124 |
| 2009/0311455 A1* | 12/2009 | Bastioli | C08J 5/18 | 428/35.7 |
| 2010/0003434 A1* | 1/2010 | Bastioli | C08J 5/18 | 428/35.2 |
| 2010/0249268 A1* | 9/2010 | Schmidt | C08J 5/18 | 523/128 |
| 2010/0305240 A1* | 12/2010 | Schmidt | C08J 3/18 | 524/47 |
| 2012/0101200 A1* | 4/2012 | Fruth | C08K 5/29 | 524/195 |
| 2012/0232191 A1* | 9/2012 | Auffermann | C08J 5/18 | 524/5 |
| 2012/0283364 A1* | 11/2012 | Sarazin | C08L 3/02 | 524/47 |
| 2012/0316257 A1* | 12/2012 | Bastioli | C08G 63/16 | 521/182 |
| 2012/0322908 A1* | 12/2012 | Bastioli | C08L 67/02 | 521/182 |
| 2013/0171383 A1* | 7/2013 | Gohil | C08L 67/04 | 428/35.1 |
| 2013/0231440 A1* | 9/2013 | Alidedeoglu | C08G 18/73 | 524/537 |
| 2013/0261198 A1* | 10/2013 | Alidedeoglu | C08J 11/24 | 521/48.5 |
| 2014/0272357 A1* | 9/2014 | He | C08L 67/04 | 428/219 |
| 2014/0336310 A1* | 11/2014 | Ichikawa | C08L 3/02 | 524/47 |
| 2014/0357808 A1* | 12/2014 | Hess | C08G 63/181 | 525/447 |
| 2015/0291733 A1* | 10/2015 | Hess | C08G 63/181 | 521/182 |

FOREIGN PATENT DOCUMENTS

| | | |
|---|---|---|
| CN | 101245175 A | 8/2008 |
| CN | 102977565 A | 3/2013 |
| JP | 2004506773 | 3/2004 |
| WO | WO0214430 | 2/2002 |
| WO | WO0216468 | 2/2002 |
| WO | WO2006074815 | 7/2006 |
| WO | WO2011054786 | 5/2011 |
| WO | WO2012151693 | 11/2012 |
| WO | WO2013017431 | 2/2013 |

OTHER PUBLICATIONS

English Translation of the International Preliminary Report on Patentability dated Sep. 13, 2016.

* cited by examiner

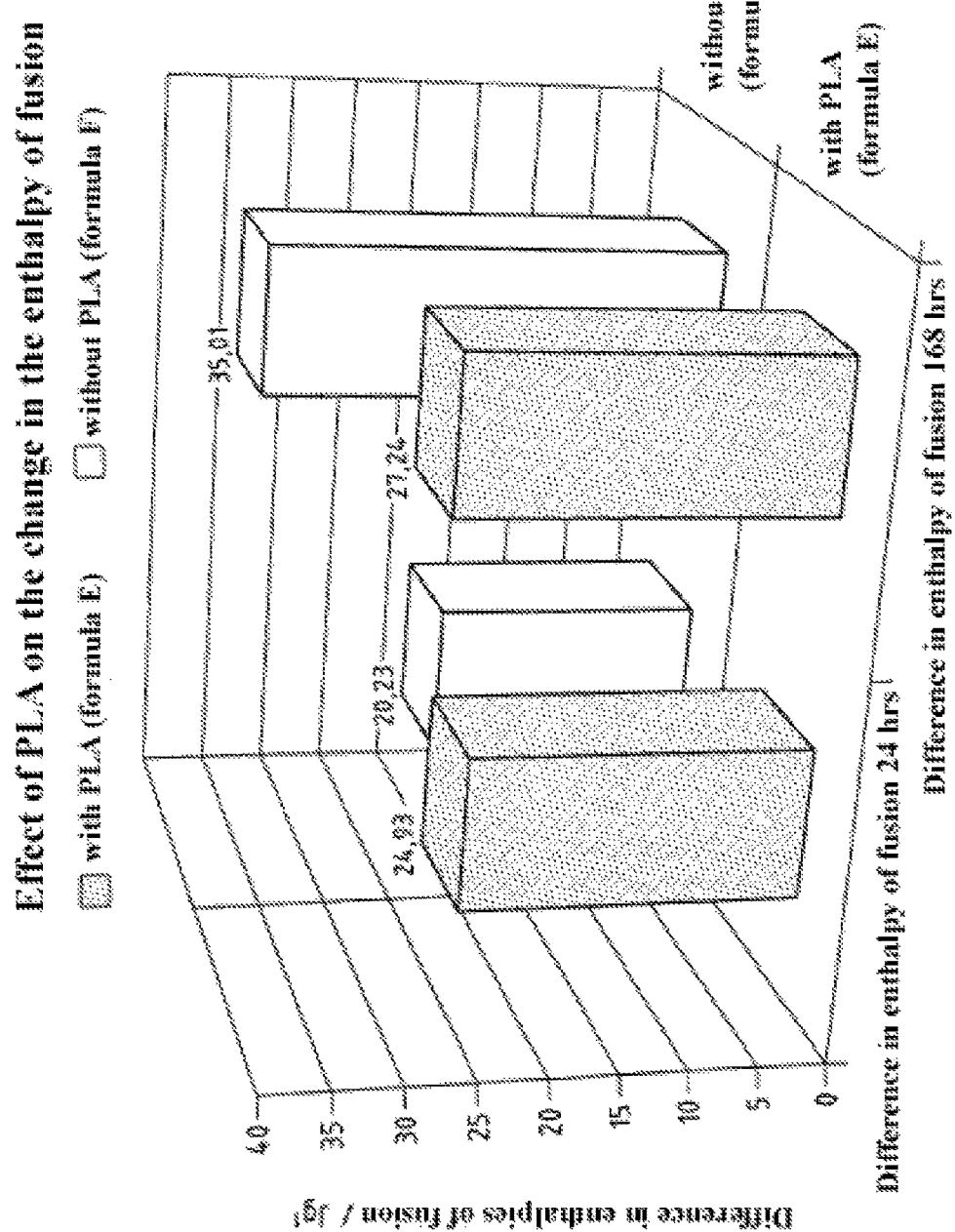

POLYMER COMPOSITION

The invention relates to a polymer composition and a method for the production thereof. Further, the invention relates to use of the polymer composition for the production of films, molded parts or fibers and articles which contain the polymer composition according to the invention.

With regard to conservation of fossil resources, waste disposal and reduction of $CO_2$ emissions, it is desirable to replace the widespread conventional plastics based on fossil raw material sources by plastics which can be at least partly or wholly obtained from renewable raw materials. Polymers which are at least partly or wholly based on renewable raw materials are also referred to as "biobased" polymers.

Biodegradable plastics are not inevitably also at the same time biobased. Thus there are some plastics from fossil, non-renewable resources which are biodegradable. Biodegradability is not tied to the raw material basis, but rather depends solely on the chemical structure of the material and its ability to be converted by biological activity into naturally occurring metabolic end products.

In practice, polymer compositions based on starch and aromatic-aliphatic copolyesters have proved their worth as biodegradable polymer compositions with outstanding mechanical properties.

One such plasticizer-free starch-based thermoplastic polymer composition, which is particularly suitable for blown film extrusion, flat film extrusion and for injection molding of completely biodegradable products is commercially available under the trade name "BIOPLAST® GF 106/02" from the company BIOTEC GmbH & Co., KG in Emmerich (Germany).

The production and properties of plasticizer-free thermoplastic polymer blends based on starch and aromatic-aliphatic copolyesters are for example described in the publications EP 0 596 437 B1 and EP 02 203 511 B1.

The main applications of biodegradable polymer compositions are in the packaging and catering sector. In addition, there are applications in agriculture and in horticulture and in the pharmaceutical and medical sector. Biodegradable polymer compositions are especially relevant for the manufacture of garbage bags, carrier bags, disposable tableware (dishes, cups, plates, cutlery), packaging films, bottles, fruit and vegetable trays (so called trays), packaging aids (loose-fill chips), mulching film, flowerpots and the like.

Although for many application fields (e.g. compostable garbage bags), as high as possible a content of renewable raw materials would be desirable, the wholly biodegradable polymer compositions and film products produced therefrom hitherto available on the market predominantly consist of polymer materials of fossil origin, such as for example aliphatic-aromatic copolyesters. To ensure acceptable mechanical parameters, the content of renewable raw materials (e.g. starch) in these polymer compositions as a rule lies markedly below 50%.

Although a further increase in the starch content in existing starch-based polymer blends would be desirable for economic and ecological reasons, this is not readily possible, since an increase in the starch content is as a rule associated with a considerable deterioration of the mechanical properties of the polymer.

Besides starch and starch derivatives, polyhydroxyalkanoates (PHA) are also very promising biobased replacement materials for polymers which are of fossil origin. PHAs are naturally occurring linear polyesters of hydroxy acids which are produced by many bacteria as reserve substances for carbon and energy and are stored inside the cell in the form of granules. Industrial biotechnological PHA production using natural or genetically modified bacterial strains or plants is known from the prior art. A review of the various PHAs and their production is given in the chapter "Polyhydroxyalkanoates" in "Handbook of Biodegradable Polymers", pages 219 to 256, publ. Rapra Technologies Limited, 2005.

However, a significant disadvantage of PHAs is that films produced from them are relatively brittle or fragile and the mechanical properties in this respect deteriorate further during storage of the films. Thus the use of larger quantities of wholly biobased PHAs such as for example PHB, PHBV and PHBH in film formulae still failed above all because of the uncontrolled, slow post-crystallization of the PHA polymers following their processing into films. The spherulites forming due to the post-crystallization presumably act as defect sites in the film and appear thus to result in a significant loss of important mechanical film properties, such as for example elongation at break and impact resistance.

Various approaches for improving the mechanical properties of PHA-containing polymer compositions, wherein use is made of nucleating agents such as for example boron nitride (BN), talc ($Mg_3[Si_4O_{10}(OH)_2]$) and limestone ($CaCO_3$) particles, cyclodextrins, polyvinyl alcohol particles, terbium oxide, saccharin, thymine, uracil, orotic acid or cyanuric acid, above all in the field of injection molding applications, are known from the prior art. The known methods have in common that through addition of such a nucleating agent, crystal nucleation and crystal growth are accelerated. This is intended to ensure that almost complete crystallization already rapidly occurs during the cooling process after the processing of the PHA-containing polymer composition and uncontrolled post-crystallization is thereby prevented. The nucleating agents have the further effect that the crystallization occurs simultaneously at many sites, so that no large spherulites, but rather many small crystallites, are formed. In contrast to spherulites, on whose interfaces prominent, macroscopically active structural weak points can form, a high crystal density as a rule does not have an adverse effect on the mechanical properties of the polymer compositions.

However, a disadvantage with the use of nucleating agents is that these cause additional costs and expenditure of labor. In addition, the use of nucleating agents in PHA-containing polymer composition has hitherto only yielded satisfactory results in the field of injection molding applications. In the important application field of film production, the addition of nucleating agents can scarcely prevent the delayed post-crystallization and embrittlement and deterioration of the mechanical properties during storage of the films associated therewith. This is due to the mostly very rapid cooling time of the melt in continuous film production in comparison to injection molding, which counteracts crystallization, which is markedly more rapid at higher temperatures.

In film production from PHA-containing polymer compositions, the most promising method until now consisted in keeping the amount of PHA as low as possible and adding relatively large quantities (e.g. greater than 80 wt. % relative to the quantity produced with PHA) of a synthetic polymer component with outstanding mechanical properties. With such films, it is also usual to keep the content of biobased polymers, such as for example starch, overall as low as possible, for example less than 30 wt. % overall, relative to the total polymer composition, in order to ensure satisfactory mechanical properties.

However, this approach is difficult or impossible to reconcile with the aim of keeping the content of biobased carbon in polymer compositions as high as possible (e.g. greater than 50%). On the one hand, in generic polymer compositions, it is precisely the biotechnologically produced PHA and the starch that contribute the biobased carbon. Moreover, most synthetic polymers, in particular also the aliphatic-aromatic copolyesters often used because of their biodegradability, are exclusively produced from fossil raw materials up to now. Consequently, increasing the content of these would only result in a worsening of the biobased carbon balance.

On the basis of the prior art explained above, one object of the invention was to provide a starch-based biodegradable polymer composition which contains contents of PHA significant for the biocarbon balance of the composition and which can still be processed into films, which display only slight or markedly retarded post-crystallization. A further object of the invention was to provide a biodegradable polymer composition which has the highest possible content of biobased polymers, such as starch and PHA, simultaneously with excellent mechanical properties.

The object is achieved according to the invention by the polymer composition stated in claim 1 and 28, the method stated in claim 21, the use stated in claim 29 and the articles mentioned in claim 30.

Advantageous embodiments of the invention are stated in the dependent claims and are explained in detail below as is the general invention concept.

The polymer composition according to the invention contains at least the following components, relative to the total weight of the polymer composition:
  a) 5 to 50 wt. % of destructured starch and/or starch derivative,
  b) 20 to 70 wt. % of aliphatic-aromatic copolyester,
  c) 10 to 50 wt. % of polyhydroxyalkanoate,
  d) 3 to 25 wt. % of polylactic acid.

An essential feature of the polymer composition according to the invention is the combination of relatively large quantities of the biobased polymers starch and/or starch derivative (5 to 50 wt. %) and PHA (10 to 50 wt. %) with 3 to 25 wt. % of polylactic acid. Surprisingly, it was found that the presence of even small quantities of polylactic acid, such as for example 3, 5 or 7.5 wt. %, in the production of starch- and PHA-containing polymeric composition results in a considerable improvement in the mechanical properties of the material, in particular its tensile strength, elongation at break and/or dart drop values measured after 24 hours storage. Usually, similar mixtures display already after a period of 24 hours a markedly altered mechanical profile (hardening, embrittlement) compared to the freshly prepared state, which is attributable to the uncontrolled post-crystallization described.

Without wishing to be bound to a specific scientific theory, the addition of PLA appears to counteract the slow post-crystallization otherwise occurring with PHA-containing polymer compositions. In spite of PHA contents of 10 to 50 wt. %, polymer compositions according to the invention retain their good mechanical properties even after storage for example for 24 hrs, and display practically no embrittlement. The effect of the PLA addition is surprising, since as a linear partly crystalline polymer pure PLA is itself relatively brittle and it was therefore not expected that it could counteract embrittlement of the polymer composition.

In a preferred embodiment, the polymer composition contains at least the following components, relative to the total weight of the polymer composition:
  a) 5 to 50 wt. % of destructured starch and/or starch derivative,
  b) 20 to 70 wt. % of aliphatic-aromatic copolyester,
  c) 10 to 50 wt. % of polyhydroxyalkanoate,
  d) 5 to 25 wt. % of polylactic acid.

The polymer composition according to the invention is characterized by excellent mechanical properties. Thus films produced from the polymer composition preferably have a tensile strength according to DIN 53455 of 5 to 60 N/mm$^2$, in particular 10 to 40 N/mm$^2$ and/or an elongation at break according to DIN 53455 of 100 to 800%, in particular 200 to 600%.

In contrast to the polymer compositions known from the prior art with comparably high contents of PHA, the films produced from the polymer composition according to the invention retain these mechanical properties to a very large extent even during storage.

Thus with the teaching according to the invention it is for the first time possible to produce starch-based polymer compositions with a PHA content of 10 to 50 wt. % where films produced from the polymer composition display no, only slight or else markedly retarded post-crystallization.

To measure this effect, the mechanical properties over the first 24 hours after film production are considered and stated below. These data are based on a comparison of film samples which were tested directly after film production, and those which were tested 24 hours after film production. Here film production means the completion of the film manufacturing process (time point after winder/rolling up of the film and cooling to room temperature). "Directly after film production" here means within the first 30 minutes after completion of the film manufacturing process.

The effect of an only slight post-crystallization of the films according to the invention is directly observable by the person skilled in the art when he touches such a film with his hands after 24 hours storage and pulls it apart or tears it. The film according to the invention still feels soft and elastic, and displays no sign or only slight signs of embrittlement compared to the state of the film directly after its production. In contrast to this, comparison films from the prior art, which contain equally high contents of PHA, but no PLA or less than 3 wt. % thereof, feel hard and brittle after 24 hours storage, and rapidly tear.

The feature "no or only slight post-crystallization" can be detected not only qualitatively but also quantitatively by means of DSC (Differential Scanning calorimetry). If a polymer sample is subjected to a defined heating/cooling program, then phase transitions which are associated with an energy transfer (glass transition, crystallization, melting, etc.) are recorded in the form of exothermic (e.g. crystallization) or endothermic (e.g. melting) peaks. A prerequisite for the appearance of a peak in the DSC measurement is therefore that the phase transition takes place during the measurement, i.e. in the course of the temperature program. Thus an amorphous sample which crystallizes during the heating creates an exothermic peak. However, if the crystallization of the sample has already taken place before the measurement (e.g. during the storage of the sample), then the energy transfer of the phase transition has already taken place before the start of the DSC measurement, and then no longer creates the corresponding energy transfer and the peak associated therewith during the measurement.

Thus, with freshly processed PHA-based materials crystallization peaks can mostly be detected in the DSC during the first heating (the sample introduced into the measuring instrument is still very largely amorphous and crystallizes during the measurement). On the other hand, a material of the same composition stored over several hours/days (and post-crystallized during the storage) no longer displays this peak, or only still in attenuated form. The existence of crystallites in the material is detectable by the appearance of (endothermic) melting peaks after attainment of the melting temperature during the DSC measurement. For the melting (destruction) of crystallites, the energy amount previously released in the crystallization is again needed and hence appears as an endothermic melting peak in the DSC diagram. The size (area) of the crystallization or melting peaks can be determined and compared by means of established software for the evaluation of DSC diagrams.

According to one embodiment, films according to the invention display only slight post-crystallization within the first 24 hours after storage. This is indicated by the fact that the size (area) of the crystallization peak measured 24 hours after storage has decreased by at most 60%, preferably at most 50%, particularly preferably at most 40% or 30%, compared with the size (area) of the crystallization peak measured directly after film production.

According to another embodiment, the polymer compositions according to the invention can also be characterized in that the degree of crystallinity of a film produced from the polymer composition increases in the first 24 hours after production by at most 20 percentage points, in particular at most 15 or at most 10 percentage points. With a degree of crystallinity of for example 40% directly after film production, an increase of 20 percentage points means that the degree of crystallinity measured after 24 hours is 60%. The terms degree of crystallinity, degree of crystallization and crystallinity are used in the literature as synonyms and designate the crystalline content of a partly crystalline solid substance.

The degrees of crystallization stated above are weight- and not volume-based, and are determined calorimetrically by determination of the technical heat of fusion (see for example Adolf Franck: Kunststoff-Kompendium [Plastics Compendium], Vogel Buchverlag, $6^{th}$ Edition, Chapter 3.2.4 on page 92 and 93 or Menges et al: Werkstoffkunde Kunststoffe [Materials Science Plastics], Hanser Verlag, $5^{th}$ Edition, Chapter 8.2.4.2, page 263 to 265).

The absent or only slight post-crystallization can also be observed microscopically in the polymer compositions according to the invention. Experiments have shown that with polymer compositions according to the invention in particular a subsequent (i.e. occurring during storage) spherulite formation is to a very large extent prevented or greatly retarded and reduced.

Spherulites are radially symmetrical crystal aggregates and are superstructural units typical of partly crystalline thermoplastic plastics. The size and number of the spherulites in a polymer influences the mechanical properties of the plastic. A disadvantage with the PHA-containing polymer compositions described in the prior art is that spherulites form by post-crystallization during their storage. As a result, the mechanical properties of the films after storage and delivery to the clients often do not match the values originally measured directly after their production. In particular, marked deterioration of the tensile strength, elongation at break and dart drop values occurs. This is presumably attributable to the macroscopically active defect sites (interfaces or edges of the spherulites) in the film.

According to one embodiment of the invention, films which contain polymer compositions according to the invention, even after 24 hours storage post production, observed through a polarization microscope, display fewer than 5 spherulites on an area of 100 µm×100 µm (average of 10 evaluations of relevant image sections). Since spherulites constitute crystalline regions and are thus birefringent, they can be detected by polarization microscopy. The image is variable and dependent on the exact polymer composition. Spherulites are as a rule recognized as circular objects and/or by means of the typical pattern ("Maltese cross"), the dark bars of which are oriented parallel to the polarization direction of the polarizer and analyzer of the microscope.

With the polymer compositions according to the invention, the absent, only slight or greatly retarded post-crystallization is also apparent in that important mechanical parameters deteriorate only insignificantly, or not at all, during the storage of the polymer composition and/or films produced therefrom.

Thus practical experiments have shown that the tensile strength, a measure of the film hardness, measured according to DIN EN ISO 527, of a film produced from the polymer composition according to the invention remains very largely stable over the first 24 hours after film production. Here, very largely stable means in particular that the tensile strength increases by at most 20%, preferably at most 15%, or at most 10% or 5%. Preferably, the tensile strength, measured according to DIN EN ISO 527, of a film produced from the polymer composition according to the invention remains very largely stable even 14 days after film production.

The dart drop value, a measure of the impact resistance according to ASTM D-1709 of a film produced from the polymer composition according to the invention remains very largely stable over the first 24 hours after film production. Here, very largely stable means in particular that the dart drop value decreases by at most 20%, preferably at most 15%, or at most 10% or 5%. Preferably, the dart drop value, measured according to ASTM D-1709, of a film produced from the polymer composition according to the invention remains very largely stable even 14 days after film production.

Further, polymer composition according to the invention are characterised in that the elongation at break, a measure of the elasticity, according to DIN 53455 of a film produced from the polymer composition according to the invention remains very largely stable over the first 24 hours after film production. Here, very largely stable means in particular that the elongation at break decreases by at most 15%, preferably at most 10%, or at most 5%. Preferably, the elongation at break, measured according to DIN 53455, of a film produced from the polymer composition according to the invention remains very largely stable even 14 days after film production.

A remarkable feature of the polymer compositions according to the invention is the good tear resistance values in the direction of extrusion (MD, machine direction), which also do not seriously deteriorate within 24 hours storage after film production. With polymer compositions known from the prior art with similarly high contents of PHA, rapid deterioration of the tear resistance in the direction of extrusion above all can be observed. In the direction of extrusion, the undesired post-crystallization becomes particularly noticeable since linear polymers such as PHA orient themselves in the direction of extrusion and also crystallize in this direction, as a result of which the tear propagation resistance in the direction of extrusion is considerably worsened compared to the transverse direction.

According to a further embodiment, the polymer compositions according to the invention are characterized in that the tear resistance in the direction of extrusion (MD) according to DIN 53455 of a film produced from the polymer composition remains very largely stable over the first 24 hours after film production. Here, very largely stable means that the tear resistance in the direction of extrusion (MD) decreases by at most 20%, preferably at most 15% or at most 10% or 5%.

According to a preferred embodiment of the invention, the polymer composition according to the invention is biodegradable according to EN 13432, in particular wholly biodegradable.

According to a further preferred embodiment of the invention, the polymer composition according to the invention has thermoplastic properties. The polymer composition is preferably thermoplastically processable.

The starch or the starch derivative used for the production of the polymer composition according to the invention is preferably obtained from potato, corn, tapioca or rice. Starch derivative, as used here, means modified or functionalized starch. As starch derivative, starch the free OH groups of which are at least partly substituted is preferably used. For example, starch modified with ether and/or ester groups is a possible option. Further examples of suitable starch derivatives are hydrophobized or hydrophilized starch, in particular for example hydroxypropyl starch or carboxymethyl starch.

Preferably, the destructured starch contained in the polymer composition according to the invention was formed from native potato starch, tapioca starch, rice starch and corn starch by mechanical and/or thermal denaturation during the production of the polymer composition.

According to the invention, the polymer composition contains 10 to 50 wt. % of destructured starch and/or starch derivative, relative to the total weight of the polymer composition. According to a preferred embodiment of the invention, the polymer composition contains 15 to 50 wt. %, preferably 20 to 50 wt. %, more preferably 20 to 45 wt. %, still more preferably 25 to 45 wt. %, most preferably 25 to 40 wt. % of destructured starch and/or starch derivative, each relative to the total weight of the polymer composition. When "starch and/or starch derivative" is mentioned here, then mixtures of various starches and/or various starch derivatives are also thereby included.

In the polymer composition according to the invention, the starch or the starch derivative is present in destructured form. Here, destructured means that the granular, crystalline structure of native starch is wholly or at least largely destroyed. This can easily be established for example by observation of blend cross-sections in the scanning electron microscope. Alternatively, the starch phase of the polymer composition can be isolated and inspected for the presence of crystalline components under a polarization microscope.

To be distinguished from destructured starch in the sense of this invention are cases in which native starch is merely used as a filler and the granular structure of the starch is at least partly retained.

Destructured starch can advantageously be present in the polymer composition according to the invention in the form of (optionally prefabricated) plasticizer-containing thermoplastic starch (TPS). However, the destructured starch in the polymer composition according to the invention is preferably as plasticizer-free as possible.

In order also to be able to obtain destructured starch without addition of carbon-containing plasticizers, native starch is preferably homogenized together with at least one hydrophobic polymer and with a sufficiently high water content under the action of high shear forces and temperatures. The water is preferably removed again by drying during or at the end of the homogenization. The production of such a plasticizer-free destructured starch in polymer blends with aromatic-aliphatic copolyesters is for example described in the publications EP 0 596 437 B1 and EP 02 203 511 B1.

According to a preferred embodiment, the polymer composition according to the invention contains less than 5 wt. %, still more preferably less than 2.5 wt. % and most preferably less than 1 wt. % or less than 0.5 wt. % of carbon-containing plasticizers. According to one embodiment, these carbon-containing plasticizers are glycerin and/or sorbitol. Further examples of carbon-containing plasticizers are arabinose, lycose, xylose, glucose, fructose, mannose, allose, altrose, galactose, gulose, idose, inositol, sorbose, talose and mono-ethoxylate, monopropoxylate and monoacetate derivatives thereof and ethylene, ethylene glycol, propylene glycol, ethylene diglycol, propylene diglycol, ethylene triglycol, propylene triglycol, polyethylene glycol, polypropylene glycol, 1,2-propanediol, 1,3-propanediol, 1,2-, 1,3-, 1,4-butanediol, 1,5-pentanediol, 1,6-, 1,5-hexanediol, 1,2,6-, 1,3,5-hexanetriol, neopentyl glycol, trimethilolpropane, pentaerythritol, sorbitol and acetate, ethoxylate and propoxylate derivatives thereof.

Further, the polymer composition according to the invention preferably contains less than 10 wt. % of low molecular weight substances and is thus essentially plasticizer-free. In the sense of the invention, low molecular weight substances are understood to be substances with a molecular weight less than 500 g/mol, in particular less than 250 g/mol. Low molecular weight substances in the sense of the invention are in particular water, glycerin, sorbitol and/or mixtures thereof.

According to a preferred embodiment of the invention, the polymer composition according to the invention contains less than 7 wt. %, in particular less than 5 wt. %, preferably less than 3 wt. % or 1.5 wt. %, relative to the whole composition, of low molecular weight substances.

The polymer composition according to the invention contains 20 to 70 wt. %, preferably 20 to 65 wt. %, more preferably 20 to 60 wt. % particularly preferably 30 to wt. %, still more preferably 30 to 55 wt. %, most preferably 30 to 50 wt. % of aliphatic-aromatic copolyester, each relative to the total weight of the polymer composition. When "aliphatic-aromatic copolyester" is mentioned here, then mixtures of various aliphatic-aromatic copolyesters are also thereby included.

For the polymer composition according to the invention, aliphatic-aromatic copolyesters which are biodegradable according to EN 13432 and/or have a glass transition temperature (Tg) less than 0° C., in particular less than −4° C., more preferably less than −10° C., still more preferably less than −20° C. and most preferably less than −30° C. are in particular possible. Further, the aliphatic-aromatic copolyesters contained in the polymer composition according to the invention are preferably thermoplastic.

According to a particularly preferred embodiment of the invention, a statistical copolyester based on at least adipic acid and/or sebacic acid is used as the aliphatic-aromatic copolyester. More preferably, it is a copolyester or statistical copolyester based on 1,4-butanediol, adipic or sebacic acid and terephthalic acid or a terephthalic acid derivative (e.g. dimethyl terephthalate DMT). This can in particular have a glass transition temperature (Tg) of −25 to −40° C., in particular −30 to −35° C. and/or a melting range from 100 to 120° C., in particular 105 to 115° C.

According to a further embodiment of the invention, the aliphatic-aromatic copolyester is essentially produced from fossil raw materials and contains less than 5% of biobased carbon according to ASTM 6866.

The polymer composition according to the invention contains 10 to 50 wt. % of polyhydroxyalkanoate, relative to the total weight of the polymer composition. According to a preferred embodiment, the polymer composition contains 15 to 45 wt. %, in particular 15 to 40 wt. %, more preferably 15 to 35 wt. %, still more preferably 15 to 30 wt. % of polyhydroxyalkanoate, each relative to the total weight of the polymer composition. When "polyhydroxyalkanoate" is mentioned here, then mixtures of various polyhydroxyalkanoates are also thereby included.

A particular aspect of the polymer composition according to the invention is that it can contain polyhydroxyalkanoates in a quantity of 10 wt. % or more, in particular also 12.5 wt. % or more, preferably 15, 18, 19 or 20 wt. % or more, without the articles produced from the polymer composition, such as for example films, undergoing substantial post-crystallization or embrittlement during storage.

The teaching according to the invention for the first time allows it to introduce larger quantities of polyhydroxyalkanoate into a starch-based polymer composition without having to accept a serious deterioration of the mechanical parameters. As a result, the possibility exists of increasing the contents of polyhydroxyalkanoate and destructured starch and/or starch derivative so far that the polymer composition according to the invention contains at least 50% of biobased carbon according to ASTM 6866 and nonetheless still possesses satisfactory mechanical properties.

A useful quantity for the biobased carbon balance of the polymer composition according to the invention is the ratio of the quantity of polyhydroxyalkanoate (this is as a rule biobased) to the quantity of aliphatic-aromatic copolyester present (this is usually of fossil origin) or to their total quantity. According to a particularly preferred embodiment of the invention, the quantity of component c) [polyhydroxyalkanoate] contained in the polymer composition is at least 20 wt. % relative to the total quantity of the components b) and c) [total quantity of aliphatic-aromatic copolyester and poly-hydroxyalkanoate] contained in the polymer composition.

When polyhydroxyalkanoate is mentioned here, then by this is meant polyhydroxy fatty acids which contain monomers with a chain length of at least 4 C atoms. Thus polylactic acid, for example, is not a polyhydroxyalkanoate in the sense of the invention, whereas poly-3-hydroxybutyrate [PHB] or poly-4-hydroxybutyrate [P4HB] are.

According to the invention, a polyhydroxyalkanoate which comprises repeating monomer units of the formula (1) is preferably used as the polyhydroxyalkanoate

[—O—CHR—CH$_2$—CO—] (1)

wherein R means an alkyl group of the formula $C_nH_{2n+1}$ and n is a number from 1 to 15, preferably from 1 to 6.

Optimal results are obtained when the polyhydroxyalkanoate is selected from poly-3-hydroxybutyrate (PHB),

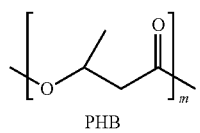

PHB poly(3-hydroxybutyrate-co-3-hydroxyvalerate) (PHBV),

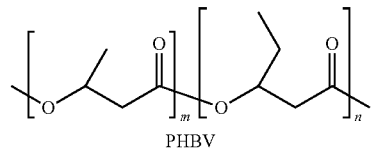

PHBV and poly(3-hydroxybutyrate-co-3-hydroxyhexanoate) (PHBH)

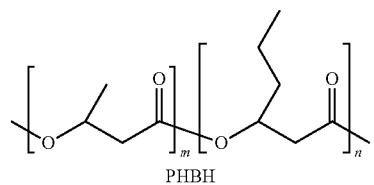

PHBH and mixtures thereof.

Particularly good results are obtained when the ratio m:n in the above structural formulae is from 95:5 to 85:15, particularly preferably from 90:10 to 88:12. According to a particularly preferred embodiment, the polyhydroxyalkanoate contains PHBH or consists thereof. Practical experiments have shown that a PHBH with a mole content of 3-hydroxyhexanoate of 5 to 15 mol. %, particularly preferably 7 to 13 mol. % or 10 to 13 mol. %, each relative to the total quantity of PHBH, yields very good results.

Results particularly relevant for practical use can be obtained when a mixture of polycaprolactone and one further polyhydroxyalkanoate, in particular PHBH, is used as the polyhydroxyalkanoate. Experiments have shown that mixtures of various polyhydroxyalkanoates which contain from 10 to 20 wt. %, preferably 12 to 18 wt. %, each relative to the total weight of polyhydroxyalkanoate, yield very good results.

According to a preferred embodiment, the polyhydroxyalkanoate is biobased and/or biotechnologically produced.

Polyhydroxyalkanoates in the sense of this invention in particular have molecular weights $M_w$ from 70,000 to 1,000,000, preferably from 100,000 to 1,000,000 or from 300,000 to 600,000 and/or melting points in the range from 100 to 190° C.

The polymer composition according to the invention contains 3 to 25 wt. % of polylactic acid, relative to the total weight of the polymer composition. According to a preferred embodiment, the polymer composition contains 5 to 25 wt. %, in particular 5 to 20 wt. %, preferably 5 to 15 wt. %, still more preferably 5 to 12 wt. %, of polylactic acid, each relative to the total weight of the polymer composition.

Results particularly useful for practical application are obtained according to the invention when the quantity of polylactic acid is selected such that the total quantity of the components a) [starch and/or starch derivative] and d) [polylactic acid] contained in the polymer composition together make up more than 30 wt. % relative to the total weight of the polymer composition.

Further, the polymer composition according to the invention can contain as a further component an epoxy group-containing polymer, wherein this is preferably an epoxy group-containing copolymer. As epoxy group-containing polymers or copolymers, in particular those which have a molecular weight $M_w$ from 1,000 to 25,000, in particular 3,000 to 10,000, are possible.

Preferably, the epoxy group-containing polymer is a glycidyl(meth)acrylate-containing polymer. A suitable glycidyl (meth)acrylate-containing polymer is for example a copolymer of (a) styrene and/or ethylene and/or methyl methacrylate and/or methyl acrylate and (b) glycidyl(meth) acrylate. Particularly suitable as a glycidyl(meth)acrylate-containing polymer is a copolymer which is selected from the group consisting of styrene-methyl methacrylate-glycidyl methacrylate, ethylene-methyl acrylate-glycidyl methacrylate and ethylene-glycidyl methacrylate. Glycidyl(meth) acrylate is preferably contained therein in a quantity from 1 to 60 wt. %, in particular 5 to 55 wt. %, more preferably 45 to 52 wt. %, relative to the total composition of the glycidyl (meth)acrylate-containing polymer.

Also possible as epoxy group-containing polymers are epoxy group-containing copolymers based on styrene, ethylene, acrylate esters and/or methacrylate esters.

The mixture preferably contains 0.01 to 5 wt. %, in particular 0.05 to 3 wt. %, still more preferably 0.1 to 2 wt. % of epoxy group-containing polymer, relative to the total composition.

The polymer composition according to the invention can also contain as a further component further polymers, wherein these are preferably polymers which are selected from the group consisting of polyvinyl acetate, polyethylene glycol, polyvinyl alcohol, chitin, chitosan, cellulose, cellulose derivatives, polyesters, polydimethylaminoethyl methacrylate and mixtures thereof. Here in particular those polymers which have a molecular weight from 1,000 to 80,000, preferably from 2,000 to 50,000, more preferably from 3,000 to 30,000 are possible. The mixture preferably contains 0.1 to 5 wt. %, in particular 0.05 to 3 wt. %, still more preferably 0.1 to 2 wt. % of these polymers, relative to the total composition.

For many use purposes, it is advantageous if the polymer composition contains at least 50% of biobased carbon according to ASTM 6866.

The teaching according to the invention for the first time allows the use of larger quantities of polyhydroxyalkanoate and starch and/or starch derivative in polymer compositions without adverse effects on the mechanical properties. Hence, according to the invention, a minimum content of 50% of biobased carbon according to ASTM 6866 can be maintained even when the aliphatic-aromatic copolyester contained in the polymer composition is essentially produced from fossil raw materials or contains less than 5% of biobased carbon according to ASTM 6866, in particular none.

According to a preferred embodiment, at least 90 wt. %, preferably at least 95 wt. % or at least 98 wt. % of the biobased carbon according to ASTM 6866 contained in the polymer composition according to the invention derives from the components a) [starch and/or starch derivative] and/or c) [polyhydroxyalkanoate].

Besides the main components starch and/or starch derivative, aliphatic-aromatic copolyester, polyhydroxyalkanoate and polylactic acid, the polymer composition according to the invention can contain still further components, in particular further polymers and/or usual additives, such as for example processing aids, plasticizers, stabilizers, flame retardants, antiblocking agents and/or fillers.

As antiblocking agents, silicic acid, talc and/or calcium carbonate are preferable options. The polymer composition preferably contains less than 1 wt. % of antiblocking agent. In a preferred embodiment, the antiblocking agents are used as a fine-grained powder. The antiblocking agent particles particularly preferably have a size of less than 100 µm, in particular less than 70 µm, more preferably less than 50 µm, still more preferably less than 30 µm and most preferably less than 15 µm.

With the teaching according to the invention it is possible with PHA-containing polymer compositions of the generic type to dispense with the addition of nucleating agents specified in the prior art and nonetheless to prevent deterioration of important mechanical properties during storage. According to one embodiment of the invention, the polymer composition contains only small quantities (e.g. less than 10 wt. % or less than 3 wt. % relative to the total composition) of nucleating agent, such as for example boron nitride (BN), talc ($Mg_3[Si_4O_{10}(OH)_2]$) and limestone ($CaCO_3$) particles, cyclo-dextrins, polyvinyl alcohol particles, terbium oxide, saccharin, thymine, uracil, orotic acid and/or cyanuric acid or none. According to a further embodiment of the invention, the polymer composition contains less than 10 wt. % of $CaCO_3$ and/or less than 3 wt. % of talc, each relative to the total composition. Preferably $CaCO_3$ and/or talc are contained in the polymer composition according to the invention overall in a quantity of less than 3 wt. % or most preferably less than 1 wt. %, each relative to the total composition, or at most in traces.

The invention further provides methods with which it is possible to obtain the polymer compositions described above.

Essentially, the methods according to the invention comprise the following steps, wherein the individual steps can be performed simultaneously or consecutively and in any order and frequency:
  i) Production of a mixture containing, relative to the total weight of the mixture, at least the following components:
    a) 5 to 50 wt. % of destructured starch and/or starch derivative,
    b) 20 to 70 wt. % of aliphatic-aromatic copolyester,
    c) 10 to 50 wt. % of polyhydroxyalkanoate,
    d) 3 to 25 wt. % of polylactic acid.
  ii) Homogenization of the mixture with application of thermal and/or mechanical energy.
  (iii) Adjustment of the water content of the mixture, so that the end product has a water content of less than 5 wt. %, relative to the total composition of the mixture.

In a preferred embodiment, the method according to the invention comprises the following steps, wherein the individual steps can be performed simultaneously or consecutively and in any order and frequency:
  i) Production of a mixture containing, relative to the total weight of the mixture, at least the following components:
    a) 5 to 50 wt. % of destructured starch and/or starch derivative,
    b) 20 to 70 wt. % of aliphatic-aromatic copolyester,
    c) 10 to 50 wt. % of polyhydroxyalkanoate,
    d) 5 to 25 wt. % of polylactic acid.
  ii) Homogenization of the mixture with application of thermal and/or mechanical energy.
  (iii) Adjustment of the water content of the mixture, so that the end product has a water content of less than about 5 wt. %, relative to the total composition of the mixture.

The process steps are preferably performed in the order stated above.

The production of the mixture of the components of the composition according to the invention can be effected in a single step or several steps. Especially good results are obtained in practice when the production of the mixture in step (i) takes place in two steps, namely that firstly
  a polymer blend A containing the components a) [destructured starch and/or starch derivative] and b) [aliphatic-aromatic copolyester] is obtained, the water content of which is less than about 5 wt. %, preferably less than about 1 wt. %, relative to the total weight of the polymer blend A,
  and subsequently
  with use of the polymer blend A and admixture of the components c) [polyhydroxyalkanoate] and d) [polylactic acid], a polymer composition as described above is produced.

Preferably, polymer blend A is produced in an extruder and used as granules in the following step. A finished, commercially available polymer blend, such as for example that obtainable under the trade name "BIOPLAST® GF 106/02" from the company BIOTEC GmbH & Co. KG in Emmerich (Germany), can be used as polymer blend A.

According to the invention, it is preferable to keep the water content of the polymer composition as low as possible. Preferably, the water content of the mixture is adjusted to less than 3 wt. %, still more preferably less than 1.5 wt. %, and most preferably less than 1 wt. %, relative to the total composition.

Water contents stated here relate to the material emerging from the extruder. To determine the water content, a sample of molten extrudate at the nozzle outlet on emergence from the extruder is collected in a sealable vessel and this is airtightly sealed. Care should be taken here that the vessel is filled with extrudate as completely as possible, so that inclusion of air in the vessel is kept as low as possible. After cooling of the sealed vessel, it is opened, a sample taken and the water content determined by Karl Fischer titration.

Preferably, the adjustment of the water content is effected by drying during the homogenization. The drying process can for example be effected by degassing the mixture or the melt, expediently by extraction of water vapor during the homogenization and/or extrusion.

The method according to the invention provides that the mixture is homogenized. The homogenization can be effected by any measures familiar to the person skilled in the art working in the field of plastics technology. The homogenization of the mixture is preferably effected by dispersion, stirring, kneading and/or extrusion. According to a preferred embodiment of the invention, shear forces act on the mixture during the homogenization. Suitable production processes for starch-containing thermoplastic polymers which are also usable analogously for the production of the polymeric material according to the invention are for example described in the publications EP 0 596 437 B1 and EP 02 203 511 B1.

According to a preferred embodiment of the invention, the mixture is heated during the homogenization (e.g. in the extruder), preferably to a temperature of 90 to 250° C., in particular 130 to 220° C.

The polymer compositions according to the invention are suitable for a great variety of purposes. In particular, the compositions are suitable for the production of molded parts, films or fibers. Because of the absent or only slight post-crystallization, the polymer compositions according to the invention are especially suitable for film production. Further, the invention also relates to molded parts, films and fibers produced from the polymer compositions according to the invention.

Films according to the invention can be blown, flat or cast films. Preferred film thicknesses for blown films according to the invention are from 12 to 100 µm, for flat films according to the invention from 150 to 500 µm and for cast films according to the invention from 10 to 500 µm.

The principle of the invention will be explained in more detail below in examples with reference to the single FIGURE (FIG. 1).

FIG. 1 shows a comparison of the increase in the enthalpies of fusion, which were determined from the melting peaks of the DSC diagrams of films of the formulae E and F after different times. For the comparative and practical examples, the following materials were used: polylactic acid, PLA (INGEO 2003D, NATUREWORKS); poly-(butylene adipate co-terephthalate), PBAT (ECOFLEX F Blend C 1201, BASF); poly(hydroxybutyrate co-hexanoate), PHBH (AONILEX X 151 A, KANEKA); poly(hydroxybutyrate co-valerate), PHBV (ENMAT Y 1000 P, TIANAN); native potato starch (EMSLANDSTARKE); epoxy group-containing copolymer, PMGMA (JONCRYL ADR 4370 S, BASF).

EXAMPLE 1 (COMPARATIVE EXAMPLE)

The following formulae A and B were compounded (metered quantities in mass percent) using a twin-screw extruder (co-rotating) of the Werner & Pfleiderer (COPERION) ZSK 40 type, screw diameter 40 mm, L/D=42:

TABLE 1

| | Formulae | |
|---|---|---|
| | A | B |
| PBAT | 41.5 | 41.5 |
| PHBH | 29.0 | 14.5 |
| Starch | 29.5 | 29.5 |
| PHBV | — | 14.5 |

During this, the following compounding parameters were maintained:

TABLE 2

| Temperature profile ZSK 40 | | | | | | | | |
|---|---|---|---|---|---|---|---|---|
| Zone 1 | Zone 2 | Zone 3 | Zone 4 | Zone 5 | Zone 6 | Zone 7 | Zone 8 | Nozzle |
| 25° C. | 150° C. | 150° C. | 140° C. | 130° C. | 130° C. | 130° C. | 130° C. | 130° C. |

Melt temp. at nozzle exit: 127° C. (A), 131° C. (B)
Number of revolutions: 120 rpm (A), 160 rpm (B)
Throughput: 40 kg/hr
Degassing: active (vacuum, zone 7)

The granules A and B were melted with a single-screw extruder of the COLLIN 30 (DR. COLLIN) type, screw diameter 30 mm, L/D=33 and further processed to blown film.

For this, the following process parameters were set:

TABLE 3

| Temperature profile COLLIN 30 | | | | |
|---|---|---|---|---|
| Zone 1 | Zone 2 | Zone 3 | Zone 4 | Nozzle |
| 165° C. | 170° C. | 170° C. | 170° C. | 170° C. |

Number of revolutions: 52 rpm (A), 51 rpm (B)
Annular nozzle: Ø=80 mm
Annular gap: 1.05 mm
Melt temp. at nozzle exit: 157° C. (A), 152° C. (B)
Blow-up ratio: 2.5
Film tube lay-flat width: 310 mm
Film thickness: 22 µm The mechanical properties of the films were determined as follows after a storage time of 24 hrs at room temperature and ambient atmosphere:

TABLE 4

Mechanical properties of the films after 24 hrs

| Film | Spec. dart drop [g/μm] ASTM D 1709 | Tensile strength [MPa] EN ISO 527 MD | | Elongation at break [%] EN ISO 527 MD | | Tear resistance [N/mm] EN ISO 6383 MD | | Puncture resistance EN 14477 | |
|---|---|---|---|---|---|---|---|---|---|
| | | MD | TD | MD | TD | MD | TD | $\varepsilon_B$ [mm] | $W_B$ [J/m] |
| A | 5.8 | 24.9 | 24.2 | 460 | 504 | 68 | 144 | 2.6 | 78.7 |
| B | 6.7 | 27.1 | 24.6 | 426 | 481 | 57 | 136 | 2.5 | 80.1 |

In films A and B, considerable post-crystallization effects in the form of hardening and embrittlement occurred, as was shown by a comparison of the mechanical properties of the films directly after production and after 24 hours storage.

Particularly striking in the results from example 1 (see table 4) is the low impact resistance (spec. dart drop) and the low tear propagation resistance in the machine direction (MD) compared to the transverse direction (TD) for both formulae A and B. This result indicates a significant orientation of the linear PHBH polymer strands with resulting post-crystallization during the film blowing. It had been surmised that an (undesired) post-crystallization, which as is known preferably occurs preferentially in chemically uniform polymer structures, could be, if not completely prevented, nonetheless significantly retarded in a polymer mixture (PHBV/PHBH, 50/50, formula B). However, this was not the case. The admixture of PHBV as a further polymer component was unable to effectively retard the post-crystallization and the embrittlement and fragility of the films caused thereby.

EXAMPLE 2

The following formula C was compounded (metered quantities in mass percent) using a twin-screw extruder (co-rotating) of the Werner & Pfleiderer (COPERION) ZSK 40 type, screw diameter 40 mm, L/D=42:

TABLE 5

Formulae

| | C |
|---|---|
| PBAT | 41.5 |
| PHBH | 21.5 |
| Starch | 29.5 |
| PHBV | 7.5 |

During this, the following compounding parameters were maintained:

TABLE 6

Temperature profile ZSK 40

| Zone 1 | Zone 2 | Zone 3 | Zone 4 | Zone 5 | Zone 6 | Zone 7 | Zone 8 | Nozzle |
|---|---|---|---|---|---|---|---|---|
| 25° C. | 150° C. | 150° C. | 140° C. | 130° C. | 130° C. | 130° C. | 130° C. | 130° C. |

Melt temp. at nozzle exit: 133° C.
Number of revolutions: 140 rpm
Throughput: 40 kg/hr
Degassing: active (vacuum, zone 7)
Water content: >1 wt. %
(measured after exit from the extruder)

Like granules A and B previously in example 1, granules C were also melted with a single-screw extruder of the COLLIN 30 (DR. COLLIN) type, screw diameter 30 mm, L/D=33 and further processed to blown film.

For this, the following process parameters were set:

TABLE 7

Temperature profile COLLIN 30

| Zone 1 | Zone 2 | Zone 3 | Zone 4 | Nozzle |
|---|---|---|---|---|
| 165° C. | 170° C. | 170° C. | 170° C. | 170° C. |

Number of revolutions: 53 rpm
Annular nozzle: Ø=80 mm
Annular gap: 1.05 mm
Melt temp. at nozzle exit: 157° C.
Blow-up ratio: 2.5
Film tube lay-flat width: 310 mm
Film thickness: 22 μm The mechanical properties of the film were determined as follows after a storage time of 24 hrs at room temperature and ambient atmosphere:

TABLE 8

Mechanical properties of the film after 24 hrs

| Film | Spec. dart drop [g/μm] ASTM D 1709 | Tensile strength [MPa] EN ISO 527 | | Elongation at break [%] EN ISO 527 | | Tear resistance [N/mm] EN ISO 6383 | | Puncture resistance EN 14477 | |
|---|---|---|---|---|---|---|---|---|---|
| | | MD | TD | MD | TD | MD | TD | $\varepsilon_B$ [mm] | $W_B$ [J/m] |
| C | 8.4 | 20.6 | 19.9 | 545 | 599 | 130 | 147 | 2.2 | 77.0 |

The results summarized in table 8 illustrate the markedly increased values for the impact resistance (spec. dart drop) and tear propagation resistance in the direction of extrusion (MD) compared to the formulae A and B in comparative example 1. Evidently the addition of small quantities of PLA to a starch-based, PHBH-containing blend already causes a marked increase in mechanical stability. This is surprising, since pure PLA is known as a relatively brittle and fragile material, with high tensile strength and relatively low puncture and tear propagation resistance. Evidently, even small proportions of PLA are capable of markedly retarding or suppressing the crystallization of PHA after processing.

EXAMPLE 3 (TWO-STEP METHOD)

The following polymer blend A was compounded (metered quantities in mass percent) using a twin-screw extruder (co-rotating) of the Werner & Pfleiderer (COPERION) ZSK 70 type, screw diameter 70 mm, L/D=36:

TABLE 9

| Formulae | |
|---|---|
| | Polymer blend A |
| PBAT | 57.4 |
| Starch | 42.6 |

During this, the following compounding parameters were maintained:

TABLE 10

Temperature profile ZSK 70

| Zone 1 | Zone 2 | Zone 3 | Zone 4 | Zone 5 | Zone 6 | Zone 7 | Zone 8 | Zone 9 | Zone 10 | Zone 11 | Nozzle |
|---|---|---|---|---|---|---|---|---|---|---|---|
| 25° C. | 190° C. | 190° C. | 190° C. | 170° C. | 170° C. | 170° C. | 170° C. | 155° C. | 100° C. | 150° C. | 140° C. |

Melt temp. at nozzle exit: 163° C.
Number of revolutions: 205 rpm
Throughput: 400 kg/hr
Degassing: active (vacuum, zone 9)
Water content: <1 wt. %
(measured after exit from the extruder)

Next, the following formula D (metered quantities in mass percent) was compounded with the granules of polymer blend A using a twin-screw extruder (co-rotating) of the Werner & Pfleiderer (COPERION) ZSK 70 type, screw diameter 70 mm, L/D=36:

TABLE 11

| Formulae | |
|---|---|
| | D |
| Polymer blend A | 70.7 |
| PHBH | 21.8 |
| PLA | 6.6 |
| PMGMA | 0.9 |

During this, the following compounding parameters were maintained:

TABLE 12

Temperature profile ZSK 70

| Zone 1 | Zone 2 | Zone 3 | Zone 4 | Zone 5 | Zone 6 | Zone 7 | Zone 8 | Zone 9 | Zone 10 | Nozzle |
|---|---|---|---|---|---|---|---|---|---|---|
| 25° C. | 160° C. | 160° C. | 130° C. | 130° C. | 120° C. | 140° C. | 170° C. | 140° C. | 140° C. | 150° C. |

Melt temp. at nozzle exit: 138° C.
Number of revolutions: 180 rpm
Throughput: 300 kg/hr
Degassing: active (vacuum, zone 8)
Water content: <1 wt. %
(measured after exit from the extruder)

Like granules A, B and C previously in examples 1 and 2, granules D were also melted with a single-screw extruder of the COLLIN 30 (DR. COLLIN) type, screw diameter 30 mm, L/D=33 and further processed to blown film.

For this, the following process parameters were set:

TABLE 13

Temperature profile COLLIN 30

| Zone 1 | Zone 2 | Zone 3 | Zone 4 | Nozzle |
|---|---|---|---|---|
| 165° C. | 170° C. | 170° C. | 170° C. | 170° C. |

Number of revolutions: 53 rpm
Annular nozzle: Ø=80 mm
Annular gap: 1.05 mm
Melt temp. at nozzle exit: 157° C.
Blow-up ratio: 2.5
Film tube lay-flat width: 310 mm
Film thickness: 22 μm The mechanical properties of the film were determined as follows after a storage time of 24 hrs at room temperature and ambient atmosphere:

TABLE 14

Mechanical properties of the film after 24 hrs

| Film | Spec. dart drop [g/μm] ASTM D 1709 | Tensile strength [MPa] EN ISO 527 | | Elongation at break [%] EN ISO 527 | | Tear resistance [N/mm] EN ISO 6383 | | Puncture resistance EN 14477 | |
|---|---|---|---|---|---|---|---|---|---|
| | | MD | TD | MD | TD | MD | TD | $\varepsilon_B$ [mm] | $W_B$ [J/m] |
| D | 9.6 | 28.2 | 24.6 | 202 | 458 | 21.83 | 43.16 | NA | NA |

The results summarized in table 14 show a markedly increased impact resistance (spec. dart drop) and higher tear resistance in the direction of extrusion (MD) compared to comparative example 1. Compared to example 2, an increased impact resistance (spec. dart drop) and a markedly increased tensile strength, above all in the direction of extrusion (MD), stand out. At the same time, the values for the elongation at break and the tear propagation resistance decrease. Evidently certain mechanical properties can be deliberately modified through the addition of small quantities of an epoxy group-containing copolymer.

EXAMPLE 4

The effect of polylactic acid on the progression of the crystallinity of films of the polymer composition according to the invention with time compared to films without polylactic acid was studied by DSC measurement on the SHIMADZU DSC-50 Q instrument. During this, the samples were each heated from 20° C. to 220° C. with a heating rate of 10° C./minute.

For this, the following formulae were compounded using the polymer blend A from example 3 under identical conditions to those in example 3:

|  | E | F |
|---|---|---|
| Polymer blend A | 70.7 | 70.7 |
| PHBH | 21.8 | 28.4 |
| PLA | 6.6 | — |
| PMGMA | 0.9 | 0.9 |

The granules E and F were then processed into blown films each of thickness 22 μm under identical conditions to those in example 3.

DSC diagrams were measured under the aforesaid conditions for films from the formulae E (with PLA) and F (without PLA) directly after the production of the films, 24 hours after the production of the films and 168 hours after the production of the films. Next, the area of the melting peak in each diagram was determined by integration. This area corresponds to the enthalpy of fusion. For formula E, the differences between the enthalpy of fusion after 24 hours and directly after production, and between the enthalpy of fusion after 168 hours and directly after production were determined, by subtracting the value of the enthalpy of fusion directly after production from the value of the enthalpy of fusion after 24 hours and after 168 hours respectively. The same differences were then determined from the integrated areas of the melting peak, that is the enthalpies of fusion, of the formula F. These differences correspond to the change in the enthalpy of fusion of the respective formula within the first 24 hours and 168 hours respectively. A comparison of these differences is shown in FIG. 1. In the front row in FIG. 1, the differences in the enthalpies of fusion after the first 24 hours and after the first 168 hours are shown for the formula E. In the back row, the differences in the enthalpies of fusion after the first 24 hours and after the first 168 hours are shown for the formula F. The values determined are written above the respective bars. Firstly, it is clearly seen that the enthalpies of fusion increase. Also striking is that the increase in the enthalpy of fusion for formula E between the first 24 hours and the first 168 hours scarcely changes, while the increase in the enthalpy of fusion for formula F between the first 24 hours and the first 168 hours almost doubles. Without wishing to be bound to a specific theory, this can be attributed to the post-crystallization in polymer compositions according to the invention being reduced through the addition of PLA in comparison to polymer compositions without PLA.

The invention has been exemplified above on the basis of practical examples. However, it goes without saying that the invention is not limited to the practical examples described. Rather, for the person skilled in the art, in the context of the invention a great variety of possible variations and modifications arise, and the scope of protection of the invention is in particular established by the following patent claims.

The invention claimed is:

1. A polymer composition containing, relative to the total weight of the polymer composition, at least the following components:
   a) 5 to 50 wt. % of destructured starch and/or starch derivative,
   b) 20 to 70 wt. % of aliphatic-aromatic copolyester,
   c) 10 to 50 wt. % of polyhydroxyalkanoate, and
   d) 3 to 25 wt. % of polylactic acid, which is less than the amount of the polyhydroxyalkanoate and reduces embrittlement resulting from crystallization of the polyhydroxyalkanoate.

2. The polymer composition according to claim 1, wherein the polymer composition contains 10 to 50 wt. %, 15 to 50 wt. %, 20 to 50 wt. %, 25 to 45 wt. % or 25 to 40 wt. % of destructured starch and/or starch derivative, each relative to the total weight of the polymer composition.

3. The polymer composition according to claim 1, wherein the polymer composition contains 20 to 65 wt. %, 20 to 60 wt. %, 30 to 58 wt. %, 30 to 55 wt. % or 30 to 50 wt. % of aliphatic-aromatic copolyester, each relative to the total weight of the polymer composition.

4. The polymer composition according to claim 1, wherein the polymer composition contains 15 to 45 wt. %, 15 to 40 wt. % or 15 to 30 wt. % of polyhydroxyalkanoate, each relative to the total weight of the polymer composition.

5. The polymer composition according to claim 1, wherein the polymer composition contains 5 to 25 wt. %, 5 to 20 wt. %, 5 to 15 wt. %, or 5 to 12 wt. % of polylactic acid, each relative to the total weight of the polymer composition.

6. The polymer composition according to claim 1, wherein the quantity of component c) contained in the polymer composition is at least 20 wt. %, relative to the total quantity of the components b) and c) contained in the polymer composition.

7. The polymer composition according to claim 1, wherein the total quantity of the components a) starch and/or starch derivative and d) polylactic acid contained in the polymer composition together makes up more than 30 wt. % relative to the total weight of the polymer composition.

8. The polymer composition according to claim 1, wherein the polymer composition according to ASTM 6866 contains at least 50% of biobased carbon.

9. The polymer composition according to claim 8, wherein the aliphatic-aromatic copolyester is produced essentially from fossil raw materials and according to ASTM 6866 contains less than 5% of biobased carbon.

10. The polymer composition according to claim 1, wherein the polymer composition according to EN 13432 is biodegradable.

11. The polymer composition according to claim 1, wherein the polyhydroxyalkanoate comprises repeating monomer units of the formula (1)

$$[-O-CHR-CH_2-CO-] \qquad (1)$$

wherein R means an alkyl group of the formula $C_nH_{2n+1}$  and n is a number from 1 to 15 or from 1 to 6.

12. The polymer composition according to claim 11, wherein the polyhydroxyalkanoate is selected from PHB, PHBV and PHBH and contains one or more of these polymers.

13. The polymer composition according to claim 1, wherein a statistical copolyester based on at least adipic or sebacic acid is used as the aliphatic-aromatic copolyester.

14. The polymer composition according to claim 1, wherein a statistical copolyester based on 1,4-butanediol, adipic acid and/or sebacic acid and terephthalic acid or a terephthalic acid derivative, in particular dimethyl terephthalate DMT is used as the aliphatic-aromatic copolyester.

15. The polymer composition according to claim 1, wherein a film produced from the polymer composition displays no or only slight post-crystallization.

16. The polymer composition according to claim 1, wherein the tensile strength of a film produced from the polymer composition remains very largely stable over the first 24 hours after film production, i.e. in particular increases by at most 20%.

17. The polymer composition according to claim 1, wherein the dart drop value according to ASTM D-1709 of a film produced from the polymer composition remains very largely stable over the first 24 hours after film production, i.e. in particular decreases by at most 20%.

18. The polymer composition according to claim 1, wherein the elongation at break according to DIN 53455 of a film produced from the polymer composition remains very largely stable over the first 24 hours after film production, i.e. in particular decreases by at most 15%.

19. The polymer composition according to claim 1, wherein the tear resistance in the direction of extrusion according to DIN 53455 of a film produced from the polymer composition remains very largely stable over the first 24 hours after film production, i.e. in particular decreases by at most 20%.

20. The polymer composition according to claim 1, wherein the polymer composition contains less than 5 wt. % of carbon-containing plasticizer, in particular glycerin or sorbitol, or none.

21. A method for producing a polymer composition comprising:
   i) producing a mixture containing, relative to the total weight of the mixture, at least the following components:
      a) 5 to 50 wt. % of destructured starch and/or starch derivative,
      b) 20 to 70 wt. % of aliphatic-aromatic copolyester,
      c) 10 to 50 wt. % of polyhydroxyalkanoate, and
      d) 3 to 25 wt. % of polylactic acid, which is less than the amount of the polyhydroxyalkanoate,
   (ii) homogenizing the mixture with application of thermal and/or mechanical energy;
   (iii) adjusting the water content of the mixture, so that the end product has a water content of less than about 5 wt. %, relative to the total composition of the mixture; and
   (iv) the polylactic acid reducing embrittlement resulting from crystallization of the polyhydroxyalkanoate.

22. The method according to claim 21, wherein the homogenization of the mixture is effected by dispersion, action of shear forces on the mixture, stirring, kneading and/or extrusion.

23. The method according to one of claim 21 or 22, wherein during the homogenization or extrusion the mixture is heated to a temperature from 90 to 250° C., in particular 130 to 220° C.

24. The method according to claim 21, wherein the water content of the mixture is adjusted to less than 3 wt. %, or less than 1.5 wt. %, or less than 1 wt. %, relative to the total composition.

25. The method according to claim 21, wherein the water content of the mixture is adjusted during the homogenizing.

26. The method according to claim 21, wherein the water content of the mixture is adjusted by degassing the mixture, in particular by degassing the melt and/or the water content of the mixture is adjusted by drying the mixture during the homogenization and/or extrusion.

27. The method according to claim 21, wherein producing the mixture in step (i) takes place in two steps, namely that firstly in
   a polymer blend A containing the components a) and b) is obtained, wherein the water content is less than about 5 wt. %, relative to the total weight of the polymer blend A,
   and subsequently
   with use of the polymer blend A and admixture of the components c) and d), the polymer composition is produced.

28. A polymer composition obtainable according to the method according to claim 21.

29. A method of manufacture comprising forming the polymer composition according to claim 1 into one or more of molded parts, films or fibers.

30. Molded parts, films or fibers containing a polymer composition according to claim 1.

31. A polymer composition containing, relative to the total weight of the polymer composition, at least the following components:
   a) 5 to 50 wt. % of destructured starch and/or starch derivative,
   b) 20 to 70 wt. % of aliphatic-aromatic copolyester,
   c) 15 to 50 wt. % of polyhydroxyalkanoate, and
   d) 3 to 25 wt. % of polylactic acid, which is less than the amount of the polyhydroxyalkanoate.

32. A polymer composition containing, relative to the total weight of the polymer composition, at least the following components:
   a) 25 to 50 wt. % of destructured starch and/or starch derivative,
   b) 20 to 70 wt. % of aliphatic-aromatic copolyester,
   c) 10 to 50 wt. % of polyhydroxyalkanoate, and
   d) 3 to 25 wt. % of polylactic acid, which is less than the amount of the polyhydroxyalkanoate.

33. A polymer composition containing, relative to the total weight of the polymer composition, at least the following components:
   a) 5 to 50 wt. % of destructured starch and/or starch derivative,
   b) 20 to 70 wt. % of aliphatic-aromatic copolyester,
   c) 10 to 50 wt. % of polyhydroxyalkanoate, and
   d) 3 to 25 wt. % of polylactic acid, which is less than the amount of the polyhydroxyalkanoate,
   wherein the polymer composition according to ASTM 6866 contains at least 50% of bio-based carbon.

* * * * *